United States Patent
Leccia et al.

(10) Patent No.: US 6,388,868 B1
(45) Date of Patent: May 14, 2002

(54) AUTOMATICALLY OPERATING INTERLOCK ASSEMBLY REQUIRING AN ELECTRICAL CABINET TO BE CLOSED BEFORE CONNECTION OF THE EQUIPMENT THEREIN

(75) Inventors: Brad R. Leccia, Bethel Park; Mary Beth Hill, Pittsburgh, both of PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/925,851

(22) Filed: Aug. 9, 2001

(51) Int. Cl.[7] ............................................... H02B 11/00
(52) U.S. Cl. ..................... 361/607; 361/615; 361/725; 361/726; 361/727; 361/732; 200/50.12; 200/50.13; 200/50.24
(58) Field of Search ................................. 361/605, 607, 361/609, 615, 724–727, 732; 200/50.21, 50.24, 50.25, 50.12, 50.13; 312/223.1, 223.2

(56) References Cited

U.S. PATENT DOCUMENTS

| 5,459,293 A | * | 10/1995 | Hodkin et al. ............ 200/50.26 |
|---|---|---|---|
| 5,757,260 A | | 5/1998 | Smith et al. |
| 5,905,244 A | | 5/1999 | Smith et al. |
| 6,038,892 A | * | 3/2000 | Schmitt ......................... 70/78 |
| 6,066,814 A | | 5/2000 | Smith et al. |
| 6,095,574 A | * | 8/2000 | Dean .......................... 292/164 |
| 6,244,891 B1 | * | 6/2001 | Robbins et al. ............. 439/372 |

FOREIGN PATENT DOCUMENTS

JP  406165323 A  *  6/1994  ................. 361/609

* cited by examiner

Primary Examiner—Leo P. Picard
Assistant Examiner—Boris L. Chervinsky
(74) Attorney, Agent, or Firm—Martin J. Moran

(57) ABSTRACT

An automatically operating interlock prevents connection of an electrical device within a cabinet unless the cabinet door is closed. The interlock is particularly useful for circuit breakers contained within arc-resistant cabinets. The interlock includes a spring-biased locking plate reciprocating between a locked position wherein the locking plate resists movement of the levering-in locking plate, and an unlocked position wherein the locking plate permits movement of the levering-in locking plate. The locking plate is spring-biased towards its locked position, and is pushed from its locked position to its unlocked position when the cabinet door is closed. Access to the hex drive of the levering-in rod is thereby resisted when the cabinet door is open.

14 Claims, 9 Drawing Sheets

AUTOMATICALLY OPERATING INTERLOCK ASSEMBLY REQUIRING AN ELECTRICAL CABINET TO BE CLOSED BEFORE CONNECTION OF THE EQUIPMENT THEREIN

BACKGROUND OF THE INVENTION

1. Field of the Invention

This invention relates to automatic lockout mechanisms for electrical equipment containers. More specifically, the invention relates to a system for preventing connection of electrical equipment within a cabinet unless the cabinet door is closed.

2. Description of the Related Art

Electrical equipment such as circuit breakers is typically housed within containers designed to prohibit access to the equipment at times when servicing the equipment would be unsafe. A circuit breaker for medium voltage applications will typically include male and female connectors for disconnecting the circuit breaker from the circuit prior to opening the circuit breaker's container. Additionally, it is generally considered desirable to house such circuit breakers within an arc-resistant container. To qualify as arc-resistant, the door of the cabinet must be closed before the circuit breaker can be connected.

Other proposed interlock designs include interlocks that are locked or unlocked based on the position of the cabinet door's handle. One such example includes a pivoting rod blocking rotation of the door's handle when a fuse box assembly is not fully disengaged from its associated circuit. When the fuse box assembly is fully retracted, a pin on a carriage roller engages a camming surface on a rod, disengaging the rod from the door handle mechanism and permitting the door to be opened. Additionally, a slider prevents access to a threaded rod of a levering-in mechanism when the door's handle is rotated away from the locked position, thereby securing the carriage in the retracted position. An interlock actuated by the position of the door itself may be more reliable than an interlock actuated based on the position of the door's handle.

Another example of an arc-resistant cabinet includes a plurality of tabs on the cabinet doors positioned behind corresponding tabs on the edges of the cabinet's door frame when the doors are closed. The interlocking tabs help the door resist an explosion inside the cabinet.

Yet another example of an interlock includes a key-actuated slider for securing a source circuit breaker in a test position. The key necessary for accessing the levering-in mechanism for the other breakers is secured within the lock of the source breaker unless the source breaker is locked in this test position, thereby cutting off current to the other breakers.

Therefore, there is a need for an improved interlock for electrical cabinets wherein the interlock mechanism is actuated by the position of the door itself, instead of the position of the door's operating handle. Additionally, there is a need for an improved interlock having fewer components, greater reliability, and easier manufacture than previous interlocks.

SUMMARY OF THE INVENTION

The present invention is an automatically operating interlock for electrical cabinets, such as arc resistant circuit breaker cabinets. The interlock prevents connecting the circuit breaker or other electrical equipment within the cabinet unless the cabinet door is closed.

A typical circuit breaker for medium voltage applications is mounted on a carriage that is movable between a forward, disengaged position and a rearward, engaged position within the cabinet containing the circuit breaker. At least one pair of quick disconnects terminating in finger clusters protrudes from the rear of the circuit breaker, being dimensioned and configured to engage a pair of stabs at the rear of the circuit breaker's cabinet when the circuit breaker is in the rearward position, thereby connecting the circuit breaker to the protected circuit. A typical medium voltage circuit breaker will use three pairs of mating stab/quick disconnect combinations. When the circuit breaker is moved to its forward position, the finger clusters are withdrawn from the quick disconnects, thereby disconnecting the circuit breaker from the circuit.

Moving the circuit breaker from one position to the other is accomplished by means of a threaded rod extending from the front to the rear of the cabinet. A levering in block engages the threaded rod so that rotation of the threaded rod pushes the levering in block either forward or rearward. The levering in block is secured to the carriage, so that rotation of the threaded rod thereby moves the carriage forward or backward. This process is known as levering in. The levering-in rod is turned by inserting a tool through an opening in the cabinet door to engage the end of the rod, which typically includes a hex drive. A levering-in locking bar surrounds the hex drive, and is spring-biased into a forward position blocking access to the hex drive. Inserting the tools through the hole in the cabinet door to engage the hex drive requires pushing the levering-in locking plate rearward as the hex drive is engaged.

The interlock includes a spring-biased locking plate reciprocating between a first position wherein the locking plate is immediately behind the levering-in locking plate, resisting rearward movement of the levering-in locking plate, and an unlocked position wherein the locking plate has been removed from contact with the levering-in locking plate, and permits movement of the levering-in locking plate. The locking plate is spring-biased towards its locked position. When the cabinet door is closed, a tab on the door engages a slot in the locking plate, thereby pushing the locking plate from its locked position to its unlocked position. Likewise, opening the door permits the locking plate to move under spring pressure from its unlocked position to its locked position. Access to the hex drive of the levering-in rod is thereby precluded unless the cabinet door is closed.

It is therefore an aspect of the present invention to provide an automatically operating interlock for electrical cabinets, preventing equipment within the cabinet from moving from a forward, disconnected position to a rearward, connected position unless the cabinet door is closed.

It is another aspect of the present invention to provide an automatically operating interlock for electrical cabinets that is actuated by the position of the cabinet door.

It is a further aspect of the present invention to provide an automatically operating interlock preventing access to the levering-in rod's hex drive unless the cabinet door is closed.

It is another aspect of the present invention to provide a locking plate that is biased towards a position wherein rearward movement of the levering-in locking plate is resisted unless the cabinet door is closed.

It is a further aspect of the present invention to provide an automatically operating interlock mechanism for electrical cabinets including a spring-biased locking plated controlled by the position of the cabinet door, and controlling access to the levering-in rod.

It is another aspect of the present invention to provide an automatically operating interlock that is simpler, more reliable, and easier to manufacture than other interlocks.

These and other aspects of the present invention will become apparent through the following description and drawings.

BRIEF DESCRIPTION OF THE DRAWINGS

Like reference numbers denote like elements throughout the drawings.

DETAILED DESCRIPTION

The invention is an automatically operating interlock for electrical cabinets, preventing connection of the electrical equipment within the cabinet unless the cabinet door is closed. The preferred embodiment is particularly useful for circuit breakers within arc resistant cabinets.

Figure 1:
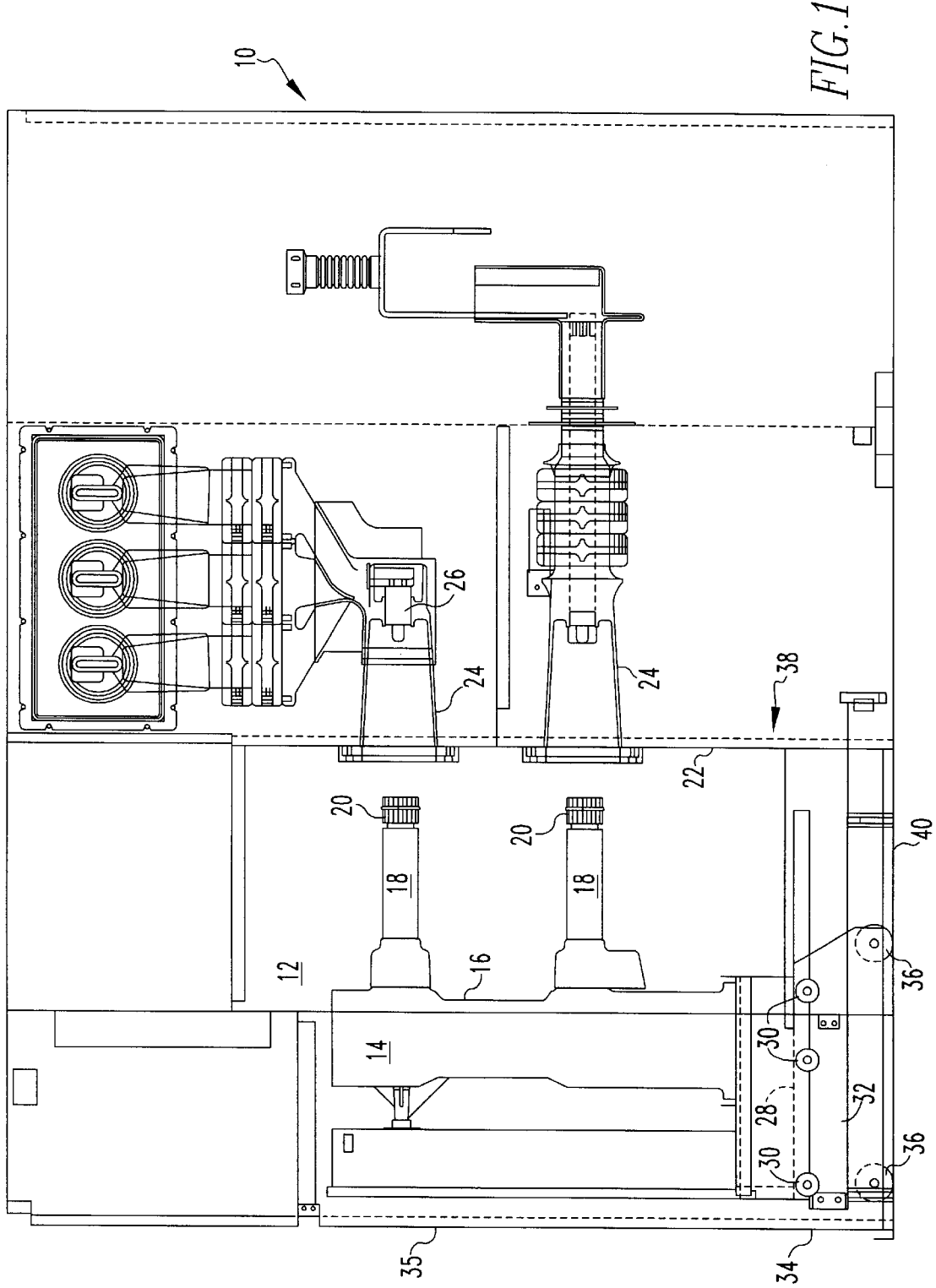
FIG. 1 is a side cross-sectional view of a circuit breaker cabinet showing the circuit breaker in its forward, disengaged position.
Figure 2:
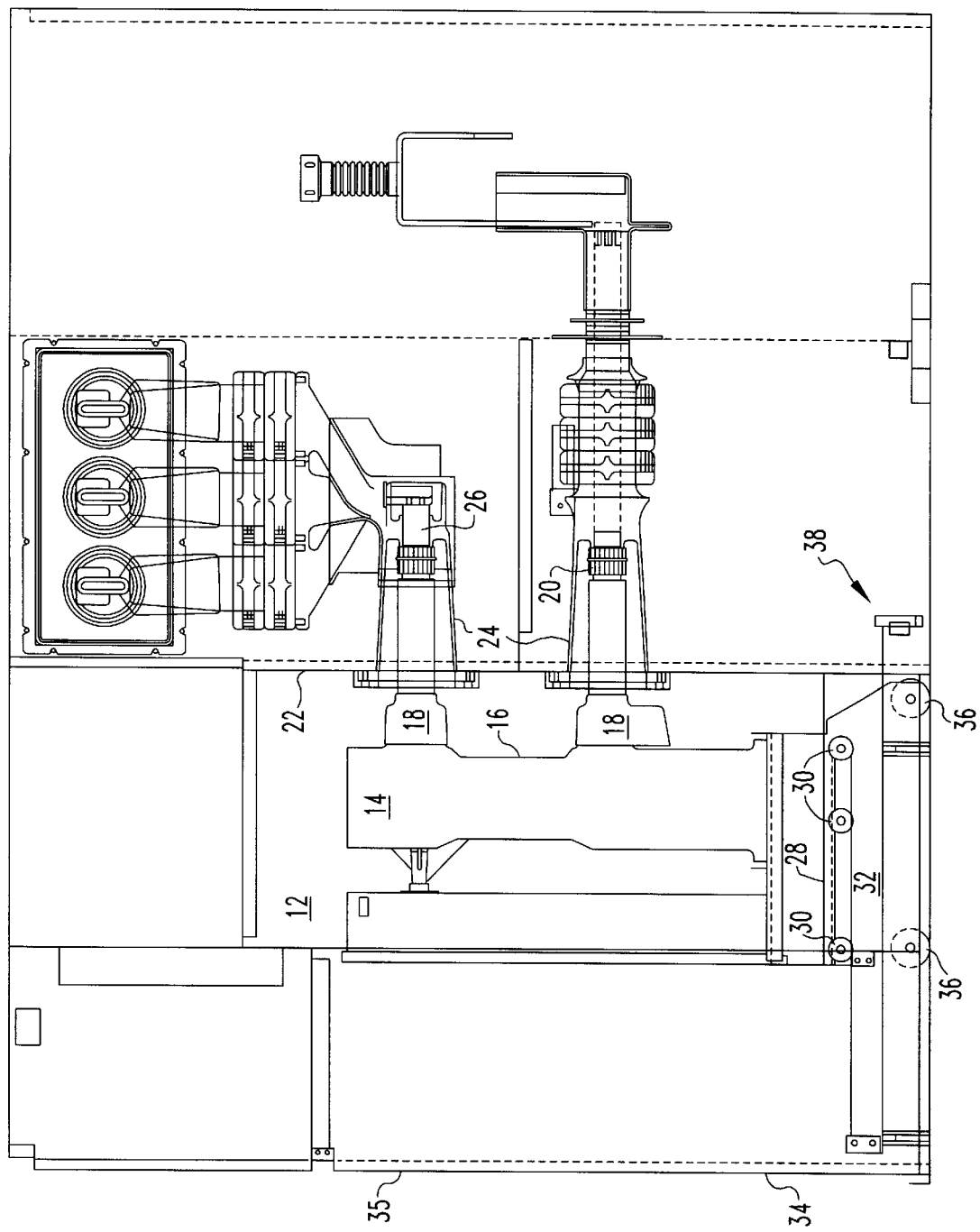
FIG. 2 is a side cross-sectional view of a circuit breaker cabinet showing the circuit breaker in its rearward, engaged position.

An interlock of the present invention is best understood through and explanation of a conventional medium voltage circuit breaker. Referring to FIGS. 1 and 2, a switchgear assembly 10 is illustrated. The switchgear 10 includes cabinet 12, containing a circuit breaker 14. The back 16 of the circuit breaker 14 includes means for electrical connection with a circuit, which are preferably at least one pair of quick disconnects 18, with each quick disconnect 18 terminating with a plurality of contact fingers 20. The cabinet's rear wall 22 includes means for connecting to the means for electrical connection of the circuit breaker to a circuit, which preferably include a pair of channels 24, with each quick disconnect containing a primary contact or stab 26. Quick disconnects 18 and contact fingers 20 are dimensioned and configured so that, when the quick disconnects 18 are inserted into the channels 24, the contact fingers 20 are electrically connected to the primary contact 26. A typical medium voltage circuit breaker will include a combination of three pairs of quick disconnects 18 and three corresponding pairs of channels 24. The bottom 28 of circuit breaker 14 may include a plurality of rollers 30, dimensioned and configured to permit the circuit breaker to move along the rails 32, extending from the cabinet's rear 22 to the cabinet's front 34. The circuit breaker 14 may also rest on rollers 36, permitting the circuit breaker 14 to move within the cabinet 12.

In use, the circuit breaker 14 will typically be in the rearward, engaged position of FIG. 2, wherein the contact fingers 20 are electrically connected to the primary contacts 26. In this position, power may be supplied through the circuit breaker to the protected circuit. When servicing the circuit breaker is desired, power is disconnected by opening the circuit breaker (using either controls on the exterior of the cabinet or remotely), and a crank (not shown and well known in the art) is secured to the hex drive 52 of drive screw 50, pushing back the levering-in locking plate 58.

Figure 3:
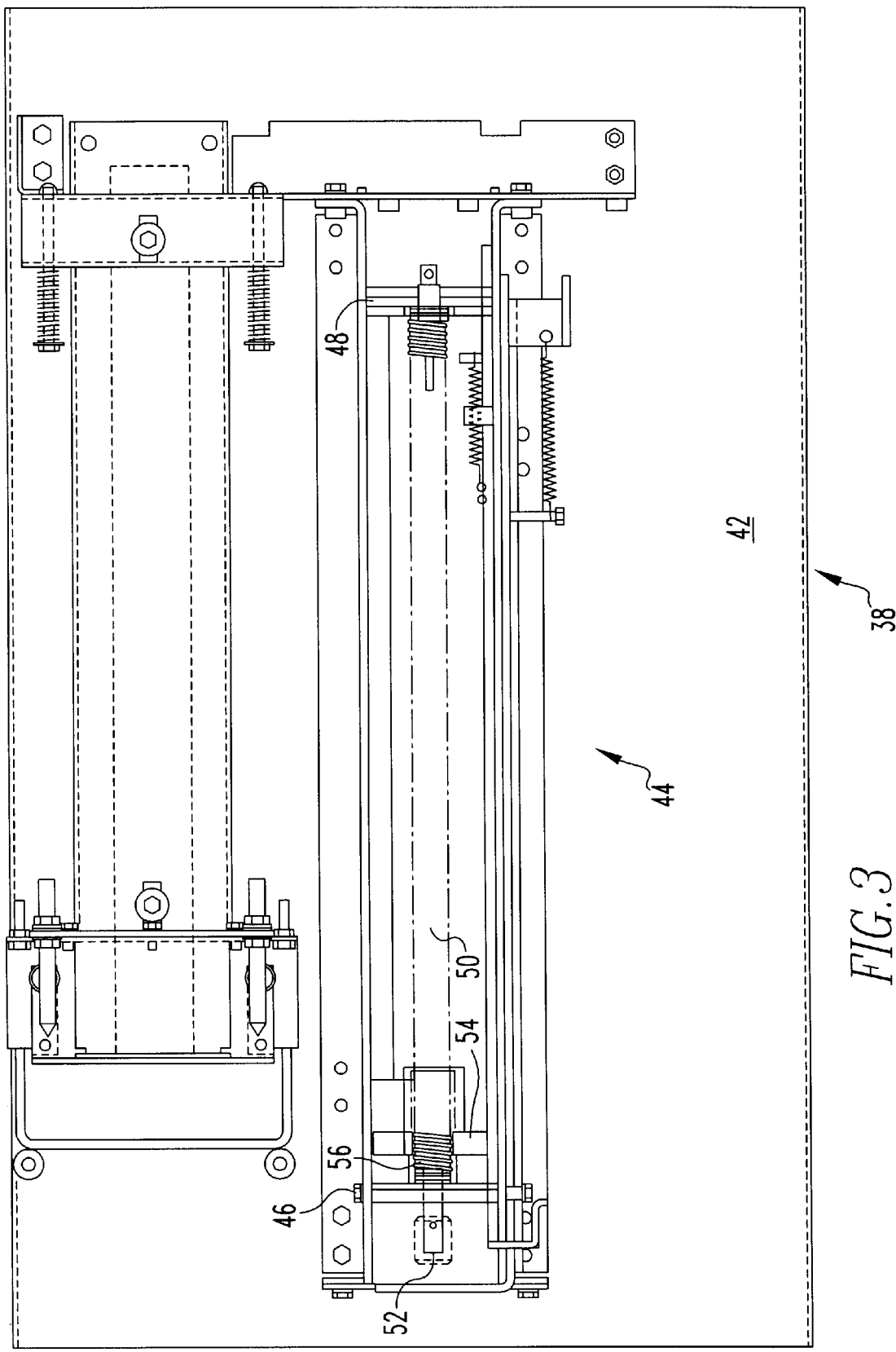
FIG. 3 is a top view of a levering-in mechanism for a circuit breaker.
Figure 10:
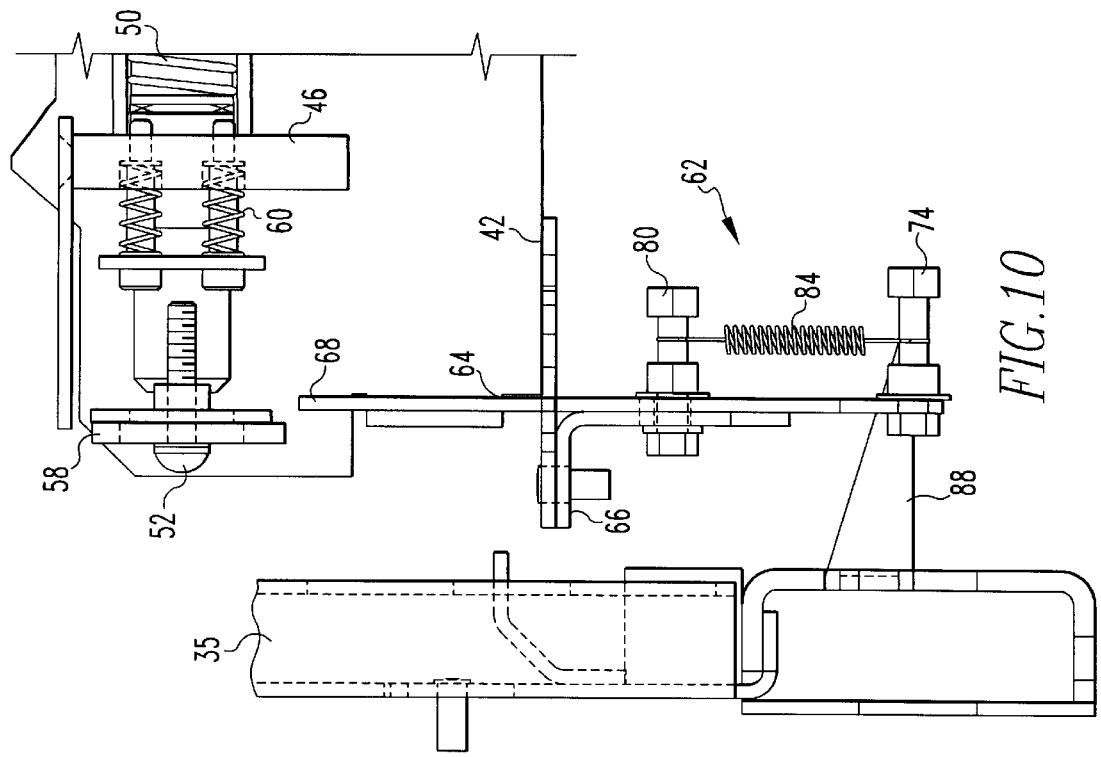
FIG. 10 is a side cross-sectional view of an interlock according to the present invention, a cabinet door, and a levering-in mechanism, illustrating the door's tab having pushed the locking plate of the interlock from its locked to its unlocked position.
Figure 9:
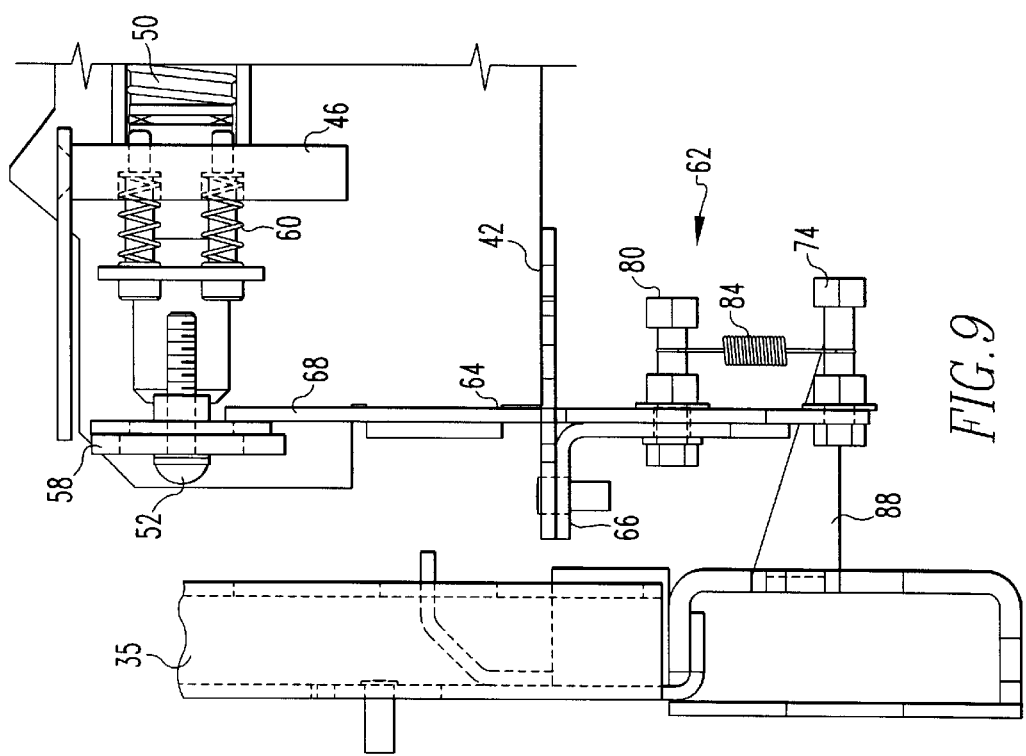
FIG. 9 is a side cross-sectional view of an interlock, cabinet door, and levering-in mechanism, showing a tab on the door engaging the interlock, prior to the door being lowered to unlock the interlock.
Figure 11:
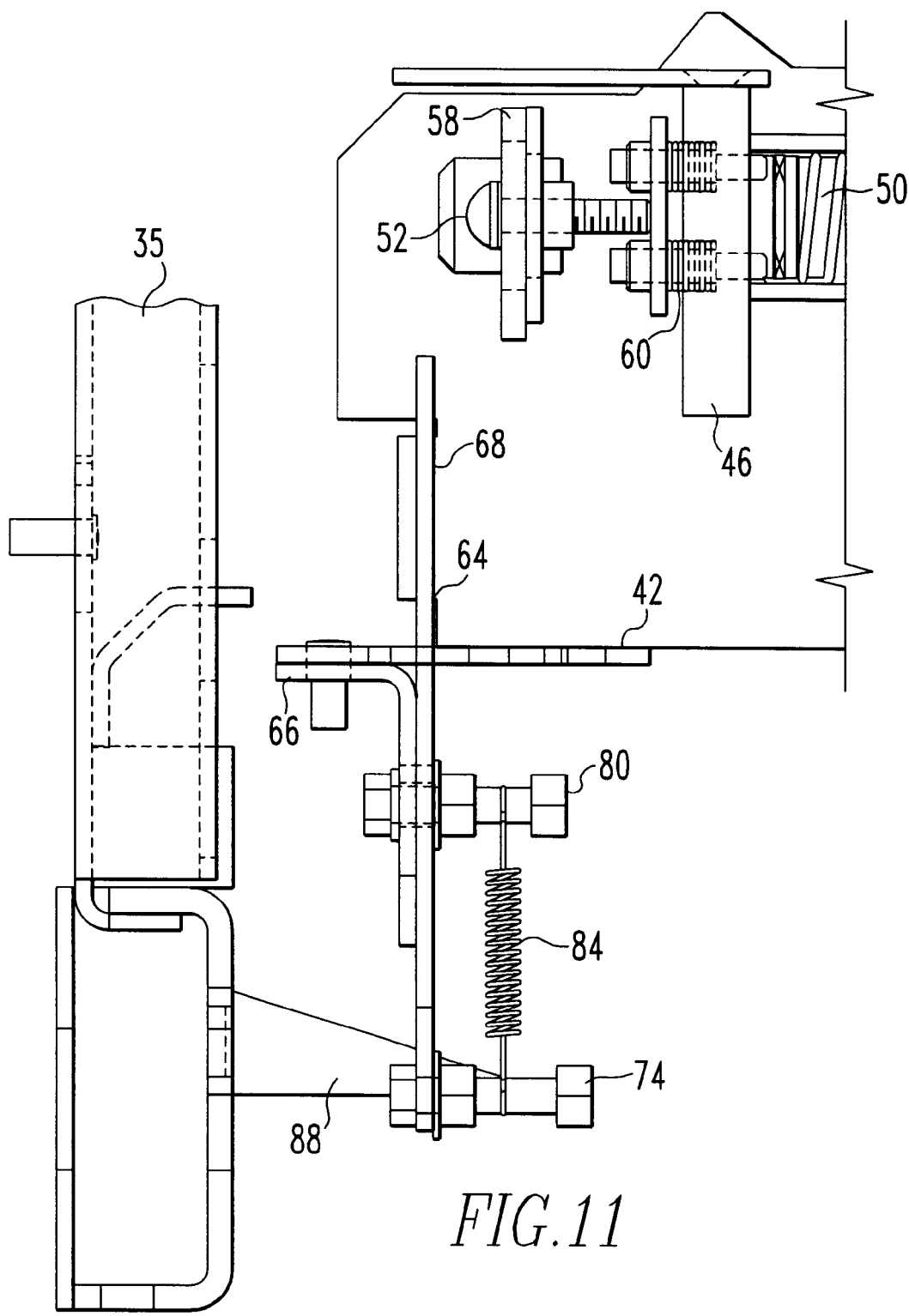
FIG. 11 is a side cross-sectional view of an interlock according to the present invention, a cabinet door, and a levering-in mechanism, illustrating the levering-in locking plate being pushed rearward after the door has been lowered, and the tab on the door has pulled the locking plate of the interlock into its unlocked position.

Referring to FIG. 3, the cabinet 12 also includes means for moving the circuit breaker 14 between a rearward position and a forward position, preferably including a levering in pan assembly 38 which is secured to the bottom 40 of the cabinet 12. The levering in pan assembly 38 includes a pan 42, upon which the levering in assembly 44 is mounted. The levering in assembly 44 includes a front bearing block 46, mounted to the front of pan 42, and a rear-bearing block 48, mounted to the rear of pan 42. A drive screw 50 extends between the front bearing block 46 and rear-bearing block 48, terminating in a tip 52, dimensioned and configured to engage a crank. The tip 52 will typically be a hex drive. A levering in block 54 is thread mounted on the drive screw 50, so that rotation of the drive screw 50 moves the levering in block 54 forward or rearward. The levering in block may also include forward stop 56. Referring to FIGS. 9–11, the levering-in mechanism also includes a levering-in locking plate 58, dimensioned and configured to surround the hex drive 52. The levering-in locking plate 58 is spring-biased forward by the springs 60 to a position wherein it precludes access to the hex drive, and is pushed rearward against the spring 60 to access the hex drive 52.

Figure 4:
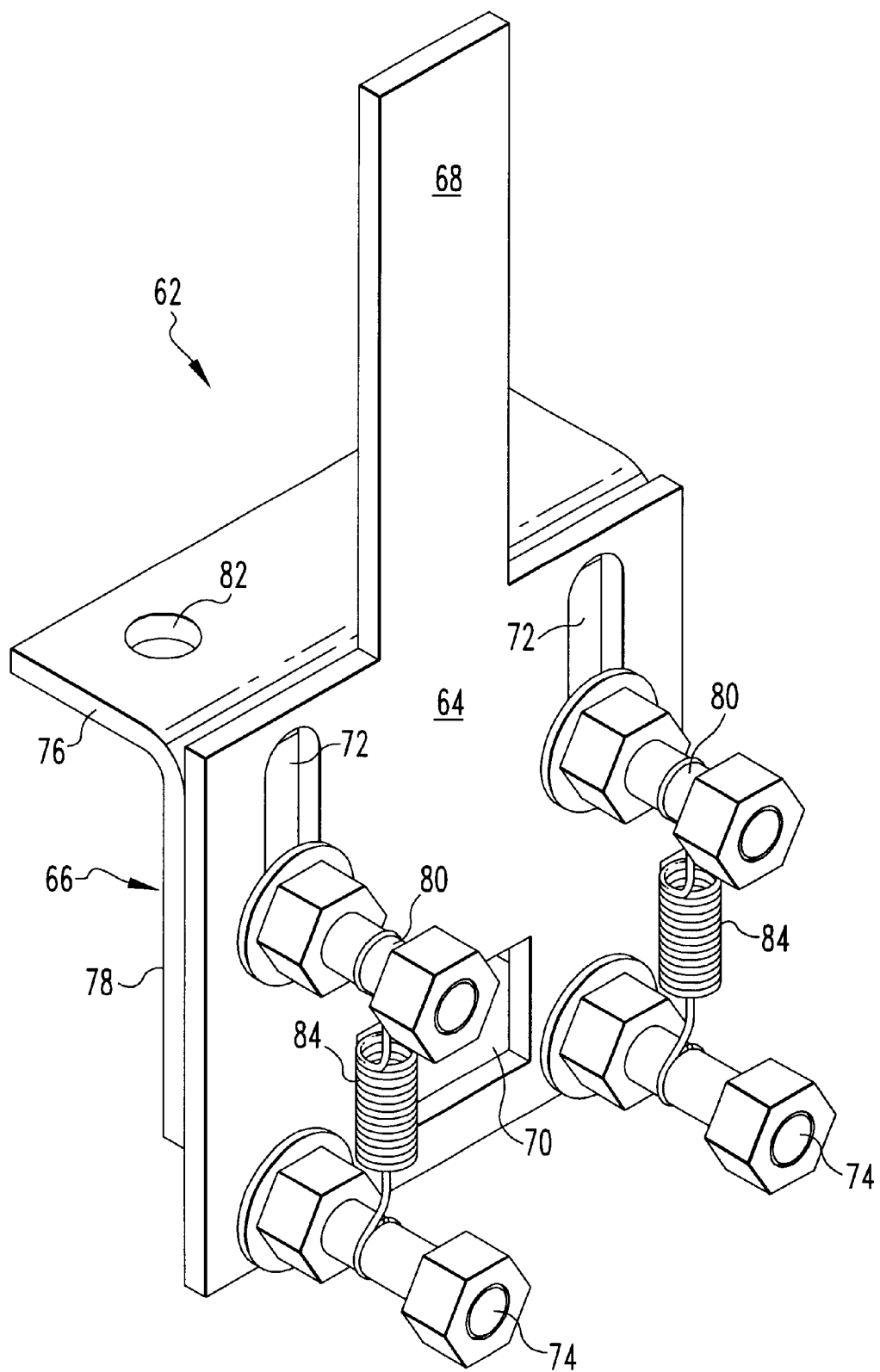
FIG. 4 is a top and front isometric view of the interlock according to the present invention, showing the interlock in the locked position.
Figure 5:
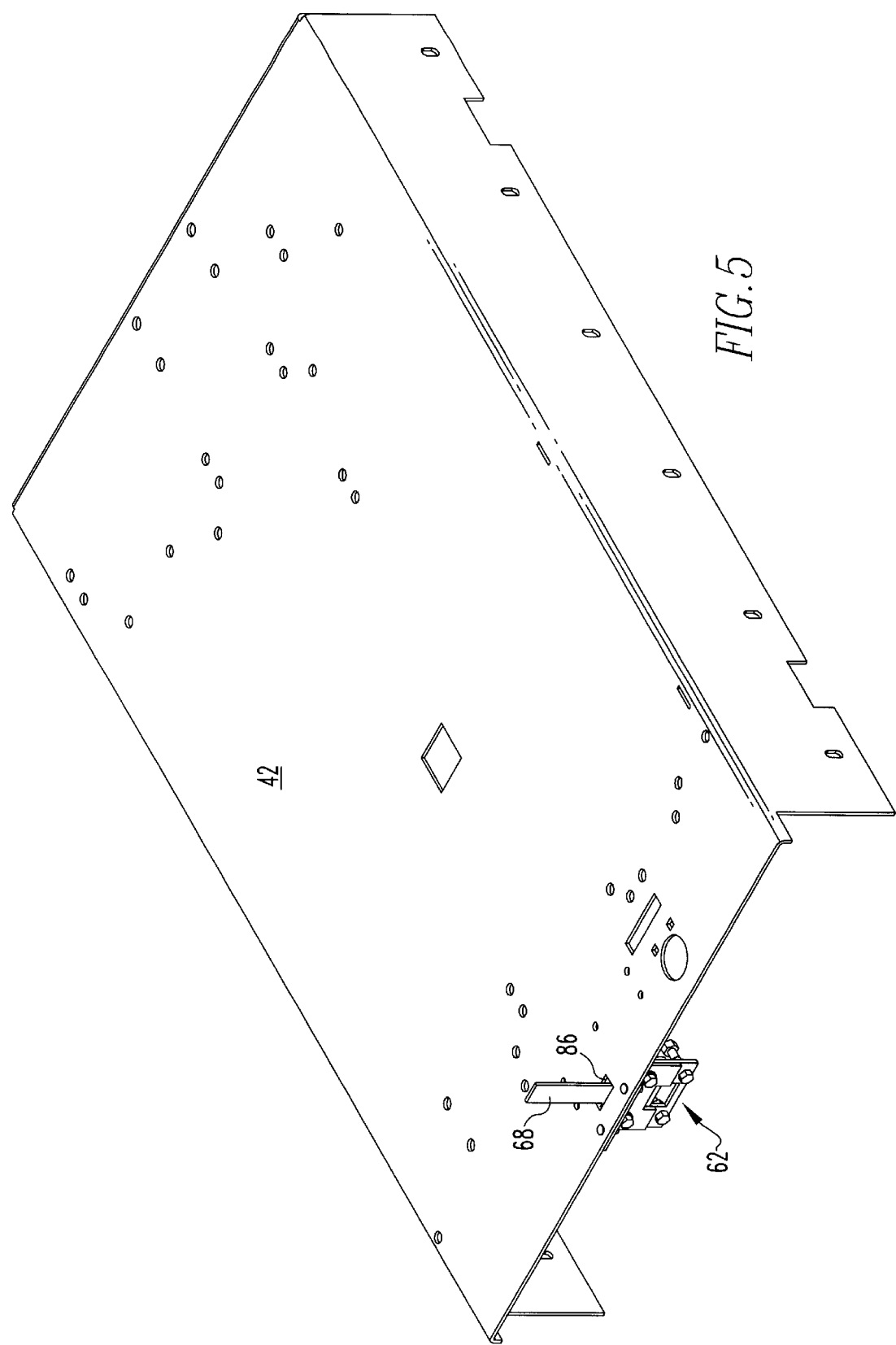
FIG. 5 is a top isometric view of a cabinet floor upon which an interlock of the present invention has been installed.
Figure 6:
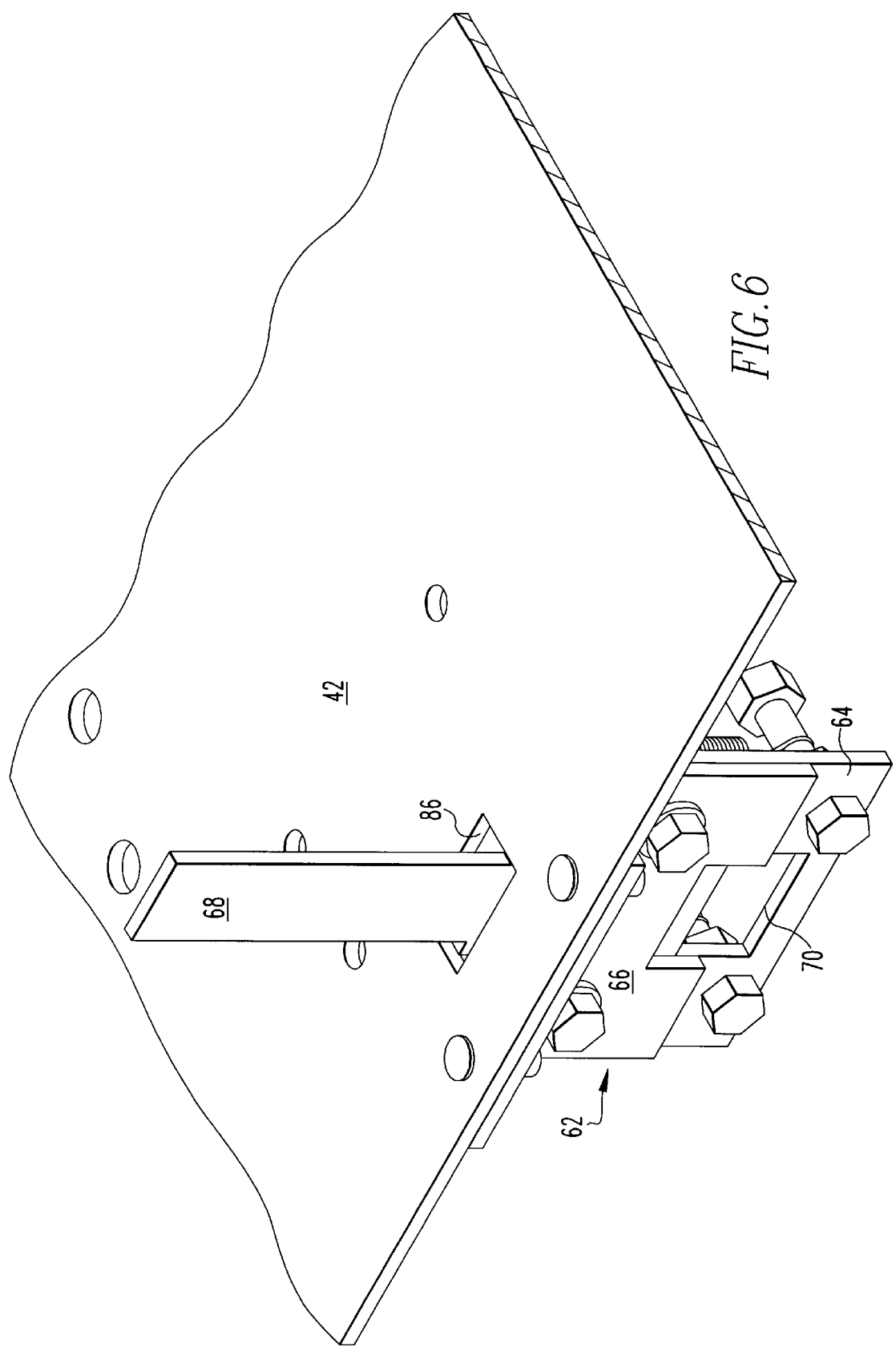
FIG. 6 is a top isometric view of an interlock according to the present invention installed in a cabinet, with the interlock in the locked position.

Referring to FIGS. 4–6, an interlock 62 of the present invention is illustrated. The interlock 62 includes a locking plate 64 slidably mounted to a mounting plate 66. The locking plate 64 includes an upwardly projecting locking tab 68, and defines a slot 70, dimensioned and configured to receive a tab secured to the cabinet door 35 (described below). The locking plate 64 also includes means for slidably mounting the locking plate to the mounting plate, which in the illustrated example are a pair of slots 72 for receiving a pair of bolts 80 (described below). Another pair of bolts 74 are secured within the locking plate 64, with the bolts 74 located approximately on the longitudinal axis of the slot 72, and projecting substantially perpendicular to the locking plate 64.

The mounting plate 66 defines a mounting portion 76, and a locking plate receiving portion 78. The locking plate receiving portion 78 includes a pair of bolts 80, substantially perpendicular to the locking plate receiving portion 78, and dimensioned and configured to slidably fit within the slot 72. The mounting portion 76 includes means for mounting the interlock to a levering-in pan assembly 38, for example, the mounting holes 82 illustrated. The interlock 62 also includes the springs 84, stretched between the bolts 74 and the bolts 80, and dimensioned and configured to bias the locking plate 64 upward.

Figure 7:
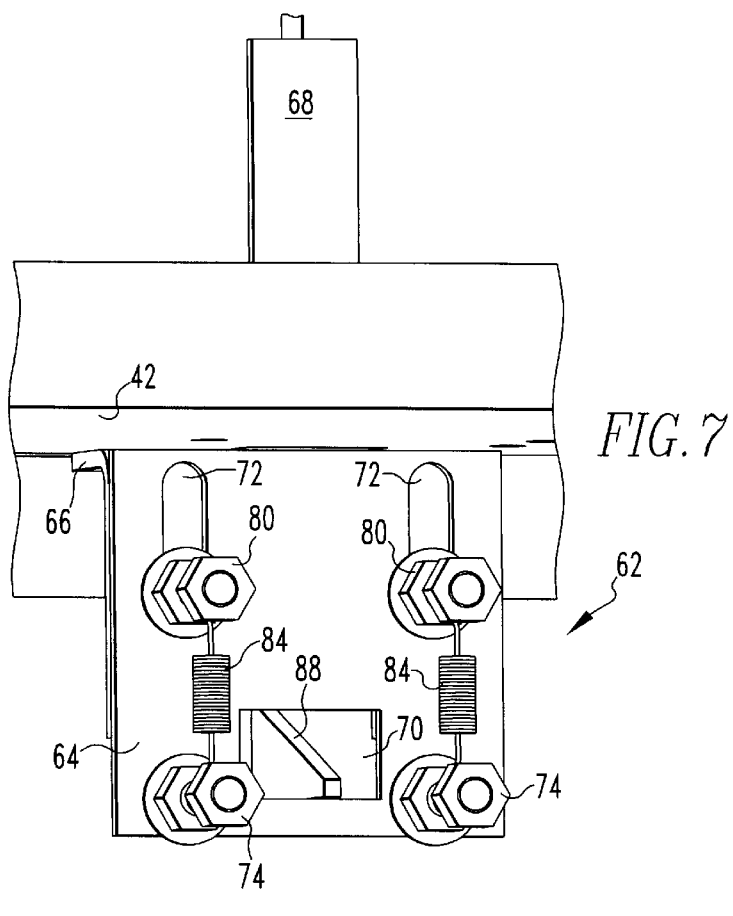
FIG. 7 is a rear isometric view of an interlock according to the present invention, illustrating the interlock secured to a cabinet floor, and in the locked position.
Figure 8:
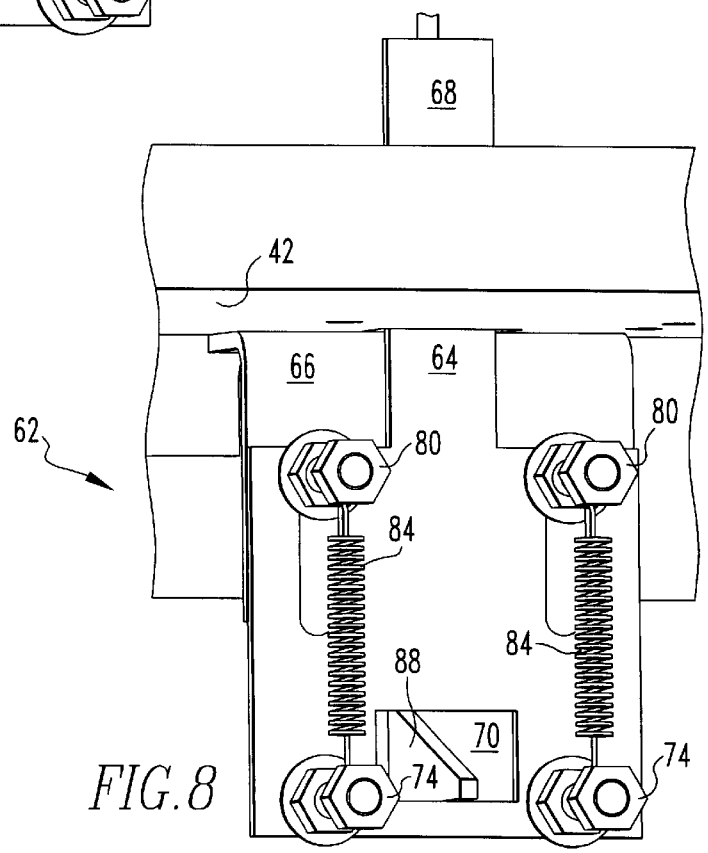
FIG. 8 is a rear isometric view of an interlock according to the present invention, illustrating the interlock secured to a cabinet floor, and in the unlocked position.

Referring to FIGS. 5–6, the interlock 62 is mounted to the bottom of the levering-in pan 42, with the tab 68 protruding upward through a hole 86 in the front of the levering-in pan 42. The interlock 62 will therefore be mounted to the levering-in pan 42 adjacent the front bearing block 46 of the levering-in assembly 44 and adjacent the front 34 of the cabinet 12. The locking plate 64 reciprocates between a locked position wherein the tab 68 resists rearward movement of the leverig-in locking plate 58 (illustrated in FIGS. 7 and 9) and an unlocked position wherein the tab 68 permits movement of the levering-in locking plate 58 (illustrated in FIGS. 8 and 10–11). The door 35 includes a tab 88, dimensioned and configured to fit within the slot 70 when the door is closed.

FIGS. 7–11 illustrate the use of the interlock 62. Beginning with the cabinet door 35 closed, the components are in the position illustrated in FIGS. 2, 8, 10 and 11. The circuit breaker 14 is in its rearward, connected position, and with the door closed, the tab 88 has engaged the locking plate 64, pulling the locking plate 64 downward against the bias of the spring 84, towards its unlocked position. When the circuit breaker 14 must be serviced, it is first moved from the rearward connected position of FIG. 2 to the forward disconnected position of FIG. 1. This is accomplished by opening the breaker, and then securing a crank to the hex drive 52 of the drive screw 50 as described above, pushing the plate 58 rearward to permit engagement with the hex drive 52, so that the drive screw 50 can be rotated to move the levering-in block 54 and the circuit breaker 14 to the forward position of FIG. 1 within the cabinet 12. At this point, the door 35 may safely be opened. As the door is opened, it is first raised, moving the locking plate 64 from the unlocked position of FIGS. 8, 10, and 11 to the locked position of FIGS. 7 and 9, wherein the tab 68 abuts the levering-in locking plate 58, resisting rearward movement of the levering-in locking plate 58. The door is then pivoted open, and the breaker 14 may be serviced.

When service to the circuit breaker 14 is complete, the door 35 is closed. The door 35 is first pivoted closed so that the tab 88 is inserted in the slot 70 of the locking plate 64. When the door is lowered to complete the closing process, the locking plate 64 is moved from the locked position of FIGS. 7–9 to the unlocked position of FIGS. 8, 10, and 11. The levering-in locking plate 58 is now free to move rearward, permitting access to the hex drive 52. The crank may then be secured to the hex drive 52 so that the drive screw can be rotated in the opposite direction, thereby moving the levering-in block 54 and circuit breaker 14 to the circuit breaker's rearward, connected position of FIG. 2.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is Claimed is:

1. An interlock for a cabinet for electrical equipment, the electrical equipment having a plurality of rollers, the cabinet having a door moving between an open position and a closed position, and a levering in mechanism for moving the electrical equipment forward and backward within the cabinet, the levering in mechanism including a threaded rod having a tip, and a tip guard plate surrounding said tip, the tip guard plate being spring-biased towards a position wherein access to the tip is blocked, said interlock comprising:

a mounting plate secured within the cabinet, adjacent to the levering in mechanism;

a locking plate slidably mounted to said mounting plate, reciprocating between a locked position and an unlocked position, said locking plate being dimensioned and configured to restrain movement of the rod tip guard plate when said locking plate is in said locked position, and to permit movement of the rod tip guard plate when said locking plate is in said unlocked position;

means for biasing said locking plate towards said locked position; and means for moving said locking plate from said locked position to said unlocked position when the door is moved into its closed position.

2. The interlock according to claim 1, wherein said means for moving said locking plate from said locked position to said unlocked position include a tab secured to the door and a slot defined within said locking plate, said slot being dimensioned and configured to receive said tab, and said tab being dimensioned and configured to push said locking plate from said locked position to said unlocked position when the door is closed.

3. The interlock according to claim 1, wherein said means for biasing said locking plate towards said locked position include at least one spring.

4. The interlock according to claim 1, wherein:

said mounting plate includes a first pair of bolts;

said locking plate includes a second pair of bolts and defines a pair of slots dimensioned and configured to slidably receive said first pair of bolts;

said first pair of bolts and said slots being dimensioned and configured to guide said locking plate between its locked position and its unlocked position; and at least one spring extends from said first pair of bolts to said second pair of bolt, said spring being said means for biasing said locking plate towards said locked position.

5. A cabinet for housing electrical equipment, the electrical equipment having a plurality of rollers, said cabinet comprising:

a door moving between an open position and a closed position;

a levering in mechanism for moving the electrical equipment forward and backward within the cabinet, said levering in mechanism including a threaded rod having a tip, and a tip guard plate surrounding said tip, said tip guard plate being spring-biased towards a position wherein access to said tip is blocked; and an interlock, comprising:
      a mounting plate secured within the cabinet, adjacent to the levering in mechanism;
      a locking plate reciprocating between a locked position and an unlocked position, said locking plate being dimensioned and configured to resist movement of said rod tip guard plate when said locking plate is in said locked position, and to permit movement of said rod tip guard plate when said locking plate is in said unlocked position:

means for biasing said locking plate towards said locked position; and means for moving said locking plate from said locked position to said unlocked position when the door is moved into its closed position.

6. The cabinet according to claim 5, wherein said means for moving said locking plate from said locked position to said unlocked position include a tab secured to said door and a slot defined within said locking plate, said slot being dimensioned and configured to receive said tab, and said tab being dimensioned and configured to push said locking plate from said locked position to said unlocked position when the door is closed.

7. The cabinet according to claim 5, wherein said means for biasing said locking plate towards said locked position include at least one spring.

8. The cabinet according to claim 6, wherein said door is dimensioned and configured to pivot from said closed position only upon raising said door, and to be lowered into a position wherein pivoting is restrained upon being pivoted into said closed position.

9. The cabinet according to claim 5, wherein:

said mounting plate includes a first pair of bolts;

said locking plate includes a second pair of bolts and defines a pair of slots dimensioned and configured to slidably receive said first pair of bolts;

said first pair of bolts and said slots being dimensioned and configured to guide said locking plate between its locked position and its unlocked position; and at least one spring extends from said first pair of bolts to said second pair of bolt, said spring being said means for biasing said locking plate towards said locked position.

10. A switchgear assembly, comprising:

a circuit breaker, comprising means:
  means for electrical connection with a circuit; and
  said circuit breaker moving between a connected position and a disconnected position; and a cabinet, comprising:
  a door moving between an open position and a closed position;
  a levering in mechanism for moving said circuit breaker forward and backward within said cabinet, said levering in mechanism including a threaded rod having a tip, and a tip guard plate surrounding said tip, said tip guard plate being spring-biased towards a position wherein access to said tip is blocked; and
  an interlock, comprising:
    a mounting plate secured within the cabinet, adjacent to the levering in mechanism;
    a locking plate reciprocating between a locked position and an unlocked position, said locking plate being dimensioned and configured to resist movement of a rod tip guard plate when said locking plate is in said locked position, and to permit movement of said rod tip guard plate when said locking plate is in said unlocked position;
    means for biasing said locking plate towards said locked position; and
    means for moving said locking plate from said locked position to said unlocked position when the door is moved into its closed position.

11. The switchgear assembly according to claim 10, wherein said means for moving said locking plate from said locked position to said unlocked position include a tab secured to said door and a slot defined within said locking plate, said slot being dimensioned and configured to receive said tab, and said tab being dimensioned and configured to push said locking plate from said locked position to said unlocked position when the door is closed.

12. The switchgear assembly according to claim 10, wherein said means for biasing said locking plate towards said locked position include at least one spring.

13. The switchgear assembly according to claim 10, wherein said door is dimensioned and configured to pivot from said closed position only upon raising said door, and to be lowered into a position wherein pivoting is restrained upon being pivoted into said closed position.

14. The switchgear assembly according to claim 10, wherein:

said mounting plate includes a first pair of bolts;

said locking plate includes a second pair of bolts and defines a pair of slots dimensioned and configured to slidably receive said first pair of bolts;

said first pair of bolts and said slots being dimensioned and configured to guide said locking plate between its locked position and its unlocked position; and at least one spring extends from said first pair of bolts to said second pair of bolt, said spring being said means for biasing said locking plate towards said locked position.

* * * * *